Patented Feb. 23, 1954

2,670,336

UNITED STATES PATENT OFFICE 2,670,336

POLYHYDRIC ALCOHOL COMPOSITIONS CONTAINING AN ALKALI SALT OF A SULFONATED ALKENYL AROMATIC RESIN

Harold H. Roth, Bay City, Mich., assignor to The Dow Chemical Company, Midland, Mich., a corporation of Delaware No Drawing. Application June 8, 1951, Serial No. 230,694

17 Claims. (Cl. 260—29.6)

1

This invention concerns new liquid compositions comprising certain alcoholic media which are thickened to increase the viscosity thereof by having certain synthetic resin sulphonates dispersed, e. g. as a colloidal solution, together therewith.

I have found that the alkali salts, e. g. the sodium, potassium and ammonium salts, of certain sulphonated resins have a property, when admixed with any of a limited group of liquid saturated aliphatic polyhydric alcohols, or with aqueous solutions of such alcohols, of becoming dissolved or swelled by the polyhydric alcoholic medium to form substantially uniform compositions which possess a desirable combination of properties rendering them useful for a number of purposes. The compositions are presumably colloidal dispersions, i. e. thin gels, but they are capable of flowing and being spread as films over solid surfaces and, accordingly, are liquid. They have lubricating properties and possess temperature-viscosity slopes which, when plotted on the A. S. T. M. standard viscosity-temperature chart E (D341) commonly used for such purpose, are exceptionally low. Also, the polyhydric alcohols employed therein are of low volatility; hence, the compositions do not undergo rapid loss by vaporization during use at moderate or low temperatures, e. g. at temperatures in the order of 200° F. and below. The compositions may be employed as lubricants, hydraulic fluids, damping fluids, or as media for the suspension of pigments or other solid particles, etc. A copending application, Serial No. 230,693, filed concurrently herewith, discloses grinding and polishing compositions prepared by admixing finely divided abrasive materials with the liquid compositions of the present invention.

The sulphonated resins which may be employed as ingredients of the compositions are substantially neutral alkali salts, e. g. sodium, potassium, or ammonium salts, of resin sulphonates obtained by the nuclear sulphonation of solid polymers and copolymers of monoalkenyl aromatic compounds having the general formula:

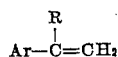

wherein Ar represents an aryl radical and R represents hydrogen or a methyl radical. Examples of such alkenyl aromatic resins are the solid homopolymers of styrene, ar-vinyltoluene, ar-vinylxylene, ar-ethylstyrene, alpha-methylstyrene, and ar-methyl-alpha-methylstyrene, and

2 solid copolymers of such alkenyl aromatic compounds with one another, e. g. copolymers of styrene and alpha-methylstyrene, or of styrene and vinyltoluene, etc. Although any such solid, resinous polymer or copolymer may be sulphonated for use in the compositions of the invention, the polymers and copolymers which, when dissolved in nine times their weight of toluene, form solutions having viscosities of from 4 to 800 centipoises at 25° C. are most satisfactory. Polystyrene is preferably employed.

The alkenyl aromatic resin is sulphonated by reaction with a sulphonating agent such as concentrated or fuming sulphuric acid, chlorosulphonic acid, or sulphur trioxide, etc., to a point at which it contains an average of from 0.55 to 0.95 sulphonic acid radical per aromatic nucleus. The mixture is then neutralized by treatment with an aqueous alkali such as sodium hydroxide, potassium hydroxide, sodium carbonate, potassium carbonate, sodium bicarbonate, potassium bicarbonate, or ammonia, etc. The resultant alkenyl aromatic resin sulphonate is separated, preferably in dry form. Procedures for carrying out these operations are known in the art.

The saturated aliphatic polyhydric alcohols which are employed as essential ingredients of the compositions of the invention are ones containing from 2 to 6 carbon atoms, and having a ratio of from 1 to 1.5 carbon atoms per atom of oxygen, in the molecule. Such polyhydric alcohols are thickened by treatment with minor amounts of the above-mentioned salts of sulphonated alkenyl aromatic resins with formation of the substantially homogeneous liquid compositions of the invention. Peculiarly, addition of the alkali resin sulphonates to a monohydric alcohol such as methyl or ethyl alcohol causes relatively little, if any, increase in viscosity of the alcohol. The alkenyl aromatic sulphonic acids are dispersible in monohydric alcohols to thicken the latter, but the alkali salts of the resin sulphonates are incompatible with monohydric alcohols. The alkali resin sulphonates were also found to be incompatible with, or to cause little if any thickening of, a number of aliphatic polyhydric alcohols of kinds other than those required by the invention. However, the polyhydric alcohols which are suitable for use in the compositions need not be entirely pure. They may contain a minor amount, e. g. 10 per cent by weight or less, of other monohydric or polyhydric alcohols.

Examples of the saturated aliphatic polyhydric alcohols which may be employed as essential ingredients of the compositions are ethylene glycol, diethylene glycol, triethylene glycol, propylene glycol, and glycerine, etc. Such polyhydric alcohols may be used individually or in admixture with one another. Also, they may be employed in substantially anhydrous form or as aqueous solutions thereof. When used in aqueous solution, the latter is of at least 30 weight per cent concentration.

The compositions of the invention are prepared by admixing one or more of the aforementioned alkali salts of sulphonated alkenyl aromatic resins with one or more of the above saturated aliphatic polyhydric alcohols, or with an aqueous solution containing at least 30, and preferably 50 or more, per cent by weight of such polyhydric alcohols to form a substantially homogeneous colloidal dispersion having a desired viscosity. Such composition becomes more viscous at a given temperature as the proportion of an alkali resin sulphonate employed in preparing the same is increased. The compositions may be prepared so as to vary in body, i. e. viscosity, from fairly thin readily flowable liquids to highly viscous liquids having a grease-like consistency similar to that of petrolatum. The viscosity to which the compositions may most advantageously be brought are dependent on the uses for which they are intended. For instance, when the compositions are to be employed as lubricants or hydraulic fluids, they are usually of a viscosity permitting ready flow of the same at room temperature. However, such composition may be prepared in a highly viscous or gel-like form when it is to be used as a medium for pigments, e. g. in water paints. The proportion of the alkali resin sulphonates to be employed in making the compositions varies with changes in the kind of resin sulphonates employed and with change in the viscosity to which the compositions are to be brought. In most instances, the compositions contain from 0.05 to 10, usually from 0.1 to 5, per cent by weight of the alkali resin sulphonate based on the combined weight of the same and the alcoholic medium in which it is dispersed.

As hereinbefore mentioned, the liquid employed in preparing a composition of the invention may consist of one or more of the suitable polyhydric alcohols in substantially anhydrous form, or of an aqueous solution of such polyhydric alcohol in a concentration of at least 30, and preferably 50 or more, per cent by weight. The compositions comprising the substantially anhydrous polyhydric alcohols have little, if any, corrosive action toward iron or steel and are sometimes preferred. However, they are capable of burning, although not highly flammable, and are more expensive to prepare than the compositions containing aqueous solutions of the polyhydric alcohols. The compositions prepared from the alkali resin sulphonates and aqueous solutions of the suitable polyhydric alcohols are corrosive toward iron and steel, but they may be rendered non-corrosive, or at least less corrosive, by adding thereto corrosion inhibitors such as are commonly employed to inhibit the corrosive attack of acids on metals. The compositions containing aqueous solutions of the polyhydric alcohols are less expensive to prepare, and are non-flammable or less readily ignited, than the compositions containing the anhydrous polyhydric alcohols. It may be mentioned that a composition containing an alkali resin sulphonate dispersed in an aqueous solution of one of the aforementioned suitable polyhydric alcohols, e. g. ethylene glycol, has a far lower freezing or congealing temperature than is possessed by a dispersion of the alkali resin sulphonate in water alone, i. e. the polyhydric alcohol ingredient serves to lower the congealing temperature of the composition. It is for this reason that the invention is limited to compositions containing, as the liquid ingredients thereof, the aforementioned suitable polyhydric alcohols in substantially anhydrous form or in the form of aqueous solutions containing at least 30 per cent by weight, and preferably 50 per cent or more, of the polyhydric alcohol.

The following examples describe a number of ways in which the invention has been practiced and illustrate certain of its advantages, but are not to be construed as limiting the invention.

EXAMPLE 1

This example describes the preparation of alkenyl aromatic resin sulphonates which were subsequently employed in preparing thickened polyhydric alcohol compositions in accordance with the invention. The preparation and properties of such compositions are described in Example 2.

*Experiment A*

Approximately 113 grams of polystyrene, having a toluene viscosity of 59 centipoises, which polystyrene was in the form of a sheet of 0.021 inch thickness, was immersed in 2 liters of sulphuric acid of 95 per cent concentration. The expression "toluene viscosity" as employed herein pertains to the viscosity in centipoises at 25° C. of a 10 per cent by weight solution of a resin in toluene. The sulphuric acid, having the polystyrene sheet immersed therein, was heated at temperatures of from 160° to 170° C. for 35 minutes, whereby the polystyrene was sulphonated. The sulphonated polystyrene was washed thoroughly with water and thereafter neutralized by treatment with sodium hydroxide. The resultant sodium salt of the sulphonated polystyrene was dried and ground to a powder. The product contained an average of 0.7 sulphonate radical per aromatic nucleus in the resin. In Example 2, this sodium polystyrene sulphonate is referred to as "NaSPS-A."

*Experiment B*

In another experiment, 300 grams of polystyrene (having a toluene viscosity of 2) was dissolved in 3.3 liters of carbon tetrachloride. The polystyrene solution was fed at a rate of 34 cc. per minute into a vessel initially containing 200 cc. of carbon tetrachloride and a separate solution of 214 cc. of chlorosulphonic acid in 3 liters of ethylene chloride was at the same time fed to the vessel at a rate of 30 cc. per minute. The reaction mixture in the vessel was stirred vigorously and maintained at room temperature or thereabout during feed of the starting materials thereto. A polystyrene sulphonic acid was thereby formed and precipitated in finely divided condition. The precipitate was separated by filtration and dried. It was then dissolved in water, neutralized with sodium hydroxide and again dried to a solid. A portion of the product was analyzed and found to contain an average of 0.87 sulphonic acid radical per benzene nucleus in the resin. This product is referred to in Example 2 as "NaSPS-B."

Experiment C

Approximately 138.6 grams of polystyrene (having a toluene viscosity of 59) was dissolved in 1.98 liters of carbon tetrachloride. The polystyrene solution, and a separate solution of 100 cc. of chlorosulphonic acid (of 95 per cent purity) in 1.98 liters of ethylene chloride were simultaneously fed, each at a rate of 30 cc. per minute, into a reaction vessel which initially contained 200 cc. of carbon tetrachloride while vigorously stirring the reaction mixture and maintaining it at room temperature or thereabout. A polystyrene sulphonic acid was thereby formed and precipitated in finely divided condition. The slurry thus formed was scrubbed with diethyl ether, to extract any sulphuric acid or unreacted chlorosulphonic acid therefrom, and then treated with ammonia in amount sufficient to neutralize the sulphonated polystyrene. The latter was removed by filtration and dried. It contained an average of 0.81 sulphonate radical per aromatic nucleus. This product is referred to in Example 2 as "NH₄SPS-C."

Experiment D

Approximately 63.5 grams of a solid homopolymer of ar-vinyltoluene (which polymer had a toluene viscosity of 28) was dissolved in 1 liter of liquid methylene chloride. The polymer solution was fed at a rate of 113 cc. per minute to a reaction vessel, which initially contained 250 cc. of methylene chloride, while at the same time feeding a solution of 270.5 cc. of chlorosulphonic acid (of 95 per cent purity) in 1.469 liters of methylene chloride to the reaction vessel at a rate of 29 cc. per minute. The feed of the two starting solutions to the reaction at the respective rates just given was carried out over a period of 58 minutes. Throughout this period the reaction mixture was stirred vigorously and maintained at room temperature or thereabout. The polymer was thereby sulphonated and the polymer sulphonic acid product was precipitated in the form of small particles. The product was separated by filtration, dried, and then admixed with ordinary carbon tetrachloride (containing a trace of moisture) to form a slurry. The polymer sulphonic acid was neutralized by passing gaseous ammonia into the slurry. The product was then removed by filtration and dried. It contained an average of 0.88 sulphonate radical per aromatic nucleus. This product is referred to in Example 2 as "NH₄SPMS-D."

EXAMPLE 2

Separate portions of the alkali resin sulphonates obtained in Example 1 were admixed with the respective polyhydric alcohols named in the following table to form substantially homogeneous dispersions, i. e. colloidal solutions, of the alkali resin sulphonates and the polyhydric alcohols. The table identifies each alkali resin sulphonate in the manner indicated in Example 1 and gives the proportion thereof as grams of the same per 100 cc. of the polyhydric alcohol with which it was admixed. The viscosities, in centistokes at 25° C., of each composition thus prepared were determined at temperatures of 77° F., 100° F., and 210° F., respectively, and are given in the table. For purpose of comparison the table also gives the viscosities at 100° F. and 210° F. of each polyhydric alcohol ingredient alone, and also of mineral oil of the grade SAE30.

TABLE

| No. | Composition Tested | | Gms. of Resin Sulphonate Per 100 cc. of Polyhydric Alcohol | Viscosity at— | | |
| --- | --- | --- | --- | --- | --- | --- |
| | Resin Sulphonate | Liquid Ingredient | | 77° F. | 100° F. | 210° F. |
| 1 | NaSPS-A | Ethylene glycol | 1 | 230 | 162 | 36 |
| 2 | NaSPS-A | ----do---- | 2 | 2,289 | 1,724 | 592 |
| 3 | NaSPS-A | ----do---- | 3 | 4,910 | 3,994 | 1,466 |
| 4 | NaSPS-A | Propylene glycol | 2 | 150 | 91 | 13 |
| 5 | NaSPS-A | Glycerine | 1 | 2,357 | 1,362 | 131 |
| 6 | NaSPS-B | Ethylene glycol | 3 | 108 | 73 | 19 |
| 7 | NH₄SPS-C | Ethylene glycol | 1.5 | 3,481 | 2,527 | 228 |
| 8 | NH₄SPMS-D | Propylene glycol | 3 | 8,576 | 7,437 | 6,198 |
| 9 | NH₄SPMS-D | Ethylene glycol | 2 | 13,870 | 12,220 | 3,200 |
| 10 | NH₄SPMS-D | Diethylene glycol | 2 | 1,756 | 1,271 | 72 |
| 11 | None | Triethylene glycol ¹ | | | 9.48 | 1.98 |
| 12 | ----do---- | Ethylene glycol | | | 20.74 | 2.61 |
| 13 | ----do---- | Propylene glycol | | | 14.99 | 2.76 |
| 14 | ----do---- | Diethylene glycol | | | 19.16 | 3.34 |
| 15 | ----do---- | Triethylene glycol ¹ | | | 118.4 | 7.95 |
| 16 | ----do---- | Glycerine | | | | |
| | ----do---- | Mineral Oil | | | 110 | 11 |

¹ Technical grade.

The slopes of the temperature-viscosity lines obtained by plotting the data of the above table on the A. S. T. M. standard viscosity-temperature chart E (D341) are lower, i. e. closer to the horizontal, for the compositions of runs 1–10 of the table than for the polyhydric alcohol ingredients of the compositions and the SAE30 mineral oil of runs 11–16. In other words, if brought to temperatures at which they are of close to the same viscosities, the compositions of runs 1–10 undergo less change in viscosity with a given amount of change in temperature than any of the individual liquids of runs 11–16 of the table.

EXAMPLE 3

A portion of the ammonium polystyrene sulphonate obtained in Experiment C of Example 1 was added with stirring to a mixed solvent consisting of 55 per cent by weight of ethylene glycol and 45 per cent water. The liquid composition thus formed was fairly viscous and was homogeneous throughout. The composition was brought to a temperature of 130° F., and while at said temperature was diluted by adding more of the same mixed solvent in amount such as to bring the viscosity of the composition to a value of approximately 10 centistokes at 130° F. The proportion of the ammonium polystyrene sulphonate in the resultant composition is not known precisely, but is estimated as being about 0.2 per cent by weight. The composition was then cooled to −40° F. and its viscosity determined. Its viscosity at −40° F. was approximately 644 centistokes. The composition was cooled further for purpose of determining its congealing and freezing temperatures. A separation of crystalline material was observed when the composition was cooled to −70° F. and the composition became frozen solid at about −74° F.

Other modes of applying the principle of the invention may be employed instead of those explained, change being made as regards the method or compositions herein disclosed, provided the steps or ingredients stated by any of the following claims or the equivalent of such stated steps or ingredients be employed.

I therefore particularly point out and distinctly claim as my invention:

1. A substantially homogeneous liquid composition consisting of a dispersion of at least one alkali salt of a sulphonated alkenyl aromatic resin, containing an average of from 0.55 to 0.95 sulphonate radical per aromatic nucleus, in a liquid medium of the group consisting of at least one saturated aliphatic polyhydric alcohol containing from 2 to 6 carbon atoms, and having a ratio of from 1 to 1.5 carbon atoms per atom of oxygen, in the molecule, and aqueous solutions of such saturated aliphatic polyhydric alcohols in a concentration of at least 30 per cent by weight, said salt of the sulphonated alkenyl aromatic resin being present in an appreciable proportion not greater than 10 per cent of the combined weight of the same and the liquid medium.

2. A liquid composition, as claimed in claim 1, containing from 0.05 to 10 per cent by weight of the alkali salt of the sulphonated alkenyl aromatic resin.

3. A liquid composition, as claimed in claim 1, wherein the liquid medium is an aqueous solution of the saturated aliphatic polyhydric alcohol in a concentration of at least 50 per cent by weight.

4. A liquid composition, as claimed in claim 1, wherein the alkali salt of the sulphonated alkenyl aromatic resin is an alkali salt of sulphonated polystyrene.

5. A liquid composition, as claimed in claim 1, wherein the alkali salt of the sulphonated alkenyl aromatic resin is a sodium salt of sulphonated polystyrene.

6. A liquid composition, as claimed in claim 1, wherein the saturated aliphatic polyhydric alcohol is ethylene glycol.

7. A liquid composition, as claimed in claim 1, wherein the saturated aliphatic polyhydric alcohol is diethylene glycol.

8. A liquid composition, as claimed in claim 1, wherein the saturated aliphatic polyhydric alcohol is propylene glycol.

9. A liquid composition, as claimed in claim 1, wherein the saturated aliphatic polyhydric alcohol is glycerine.

10. A substantially anhydrous liquid composition comprising a dispersion of at least one alkali salt of a sulphonated alkenyl aromatic resin containing an average of from 0.55 to 0.95 sulphonate radical per aromatic nucleus, in a liquid medium consisting essentially of at least one saturated aliphatic polyhydric alcohol containing from 2 to 6 carbon atoms, and having from 1 to 1.5 carbon atoms per atom of oxygen, in the molecule, said salt of the sulphonated alkenyl aromatic resin being present in an appreciable proportion not greater than 10 per cent of the combined weight of the same and the liquid medium.

11. A liquid composition, as claimed in claim 10, containing from 0.5 to 10 per cent by weight of the alkali salt of the sulphonated alkenyl aromatic resin.

12. A liquid composition, as claimed in claim 10, wherein the alkali salt of the sulphonated resin is an alkali salt of sulphonated polystyrene.

13. A liquid composition, as claimed in claim 10, wherein the alkali salt of the sulphonated resin is a sodium salt of sulphonated polystyrene.

14. A liquid composition, as claimed in claim 13, wherein the liquid medium consists essentially of ethylene glycol.

15. A liquid composition, as claimed in claim 13, wherein the liquid medium consists essentially of diethylene glycol.

16. A liquid composition, as claimed in claim 13, wherein the liquid medium consists essentially of propylene glycol.

17. A liquid composition, as claimed in claim 13, wherein the liquid medium consists essentially of glycerol.

HAROLD H. ROTH.

References Cited in the file of this patent

UNITED STATES PATENTS

| Number | Name | Date |
|---|---|---|
| 2,455,961 | Walker | Dec. 14, 1948 |
| 2,533,210 | Baer | Dec. 12, 1950 |